(12) United States Patent
Lee (10) Patent No.: US 7,740,360 B2
(45) Date of Patent: Jun. 22, 2010

(54) IMAGE DISPLAY APPARATUS (75) Inventor: Sang-goog Lee, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 949 days.

(21) Appl. No.: 11/484,583

(22) Filed: Jul. 12, 2006

(65) Prior Publication Data

US 2007/0040991 A1 Feb. 22, 2007

(30) Foreign Application Priority Data

Aug. 19, 2005 (KR) .................. 10-2005-0076331

(51) Int. Cl.
*G03B 21/14* (2006.01)

(52) U.S. Cl. .................. 353/82; 348/744; 359/211.1

(58) Field of Classification Search .................. 353/38, 353/39, 40, 50, 51, 81, 82, 84, 89; 348/23, 348/744, 205; 359/17, 18, 201.1, 196, 197, 359/198, 199, 200, 201, 211.1
See application file for complete search history.

(56) References Cited

U.S. PATENT DOCUMENTS 4,180,306 A * 12/1979 Duhrkoop et al. ......... 359/211.1
2005/0231651 A1* 10/2005 Myers et al. ............... 348/744

* cited by examiner

*Primary Examiner*—Georgia Y Epps
*Assistant Examiner*—Sultan Chowdhury (57) ABSTRACT

An image display apparatus includes a reflection-type image display device providing partial images that constitute an image frame by reflecting light irradiated from a light-emitting unit, and a distributive projector unit displaying the image frame by discretely projecting the partial images onto different positions.

10 Claims, 13 Drawing Sheets

IMAGE DISPLAY APPARATUS

CROSS-REFERENCE TO RELATED APPLICATIONS

This application claims the benefit of Korean Patent Application No. 10-2005-0076331 filed on Aug. 19, 2005 in the Korean Intellectual Property Office, the disclosure of which is incorporated herein by reference in its entirety.

BACKGROUND OF THE INVENTION

1. Field of the Invention

The present invention relates to an image display apparatus, and more particularly to an image display apparatus displaying a complete image frame by projecting partial images, which are provided by at least one reflection-type image display device, onto appropriate positions.

2. Description of the Related Art

DLP (Digital Light Processing) technology is being focused on as worldwide demand for digital broadcasting-related technologies and equipment increases. A DMD (Digital Micro-mirror Device), a core device of DLP technology, is a type of semiconductor optical switch with integrated micro-mirrors. A micro-mirror with a square shape, one side of which has a length in a range of 14 to 16 µm is provided on each semiconductor cell, and the micro-mirror operates by electrostatic action of the semiconductor cell disposed directly thereunder. Each micro-mirror corresponds to one pixel, and constitutes an image by adjusting a light reflection angle to express color and brightness. An operation of the DMD will be described as follows with reference to FIG. 1.

Figure 1:
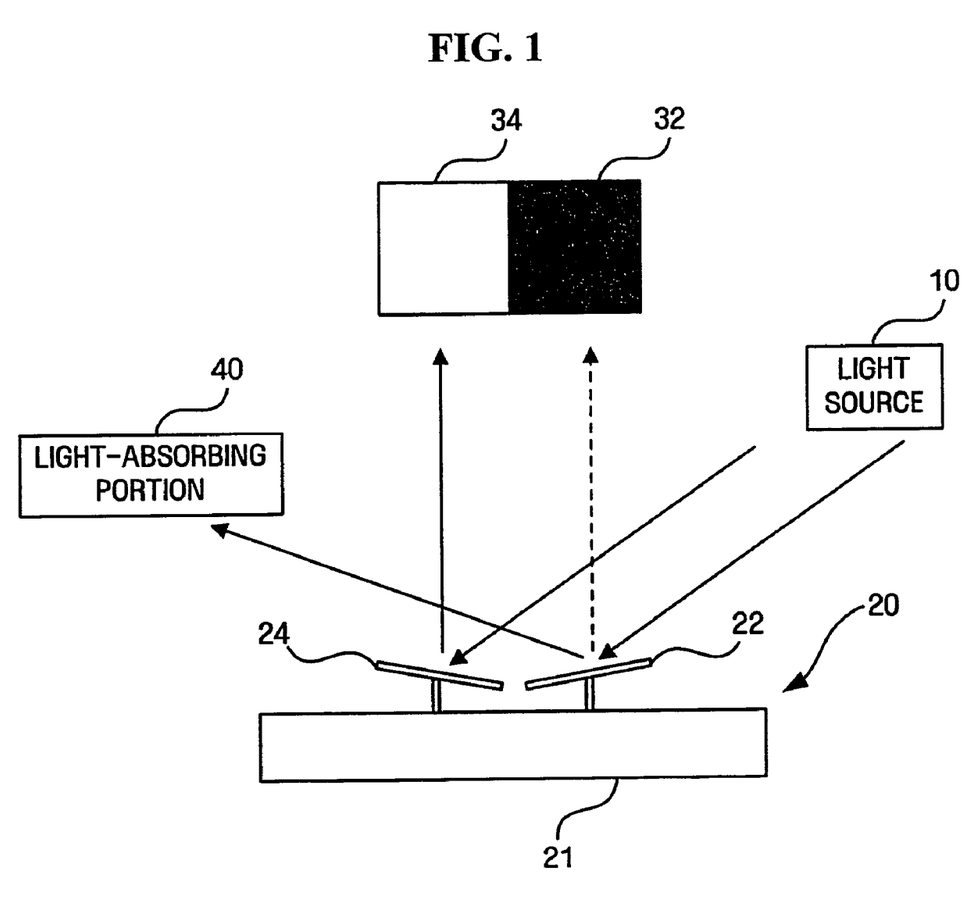
FIG. 1 is a view schematically illustrating an operation of a related DMD device.

FIG. 1 is a view schematically illustrating an operation of a related DMD device. A DMD 20 includes a first micro-mirror 22 and a second micro-mirror 24 provided on a semiconductor substrate 21, and each of the micro-mirrors 22, 24 controls one pixel. The respective micro-mirrors 22, 24 can be inclined at a certain angle according to an electrical signal applied to the semiconductor substrate 21. Commercialized micro-mirrors generally have an incline angle of ±10 degrees.

The micro-mirrors 22, 24 are inclined at an angle of +10 or −10 degrees according to an on/off signal applied to the semiconductor substrate 21. As a result, the micro-mirrors 22, 24 reflect R (Red), G (Green) and B (Blue) light irradiated from a light source 10 toward a screen (not illustrated) or a light-absorbing portion 40. Here, the light-absorbing portion 40 absorbs the light reflected thereto to prevent unnecessary diffusion of light.

It should be noted from the example illustrated in FIG. 1 that a pixel 32 controlled by the first micro-mirror 22, and a pixel 34 controlled by the second micro-mirror 24 are in off and on states, respectively.

In this way, by rapidly adjusting the inclination of the respective micro-mirrors 22, 24 provided in the DMD 20, the respective pixels 32, 34 controlled by the micro-mirrors 22, 24 are repeatedly put in on-off states for light projection, so that brightness and color can be displayed.

Employment of the DMD can reduce noise or deterioration of image quality occurring when a digital signal is converted into an analog signal, and can prevent color bleeding and spotting. Also, since the distance between the micro-mirrors is very small (approximately 1 µm) the DMD is suitable for processing the high-definition and high-luminance moving image of the HD (High Definition) digital television system.

In such a DMD, since each micro-mirror controls one pixel, the quality and the resolution of a display increases as the number of micro-mirrors increases, which can be achieved by reducing the size of micro-mirrors or increasing the on-chip area of DMD.

However, there is a limitation in reducing the size of micro-mirrors, and increasing the on-chip area of a DMD is an obstacle to miniaturizing an image display apparatus. Further, when the on-chip area of the DMD increases, the yield of a micro-mirror is lowered, which is a problem.

Therefore, a technology is required that is capable of maintaining the size and the quality of an image projected by an image display apparatus when the image display apparatus is miniaturized.

SUMMARY OF THE INVENTION

Accordingly, it is an aspect of the present invention to solve the above-mentioned problems occurring in the related art. It is another aspect of the present invention to provide an image display apparatus that can maintain the quality of a projected image while simplifying a reflection-type image display device.

Additional aspects and/or advantages of the invention will be set forth in part in the description which follows and, in part, will be apparent from the description, or may be learned by practice of the invention.

The foregoing and/or other aspects are achieved by providing an image display apparatus including: a light-emitting unit; a reflection-type image display device providing partial images comprising an image frame, by reflecting light irradiated from the light-emitting unit; and a distributive projector unit displaying the image frame by discretely projecting the partial images, which the reflection-type image display device provides thereto, onto different positions thereof.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
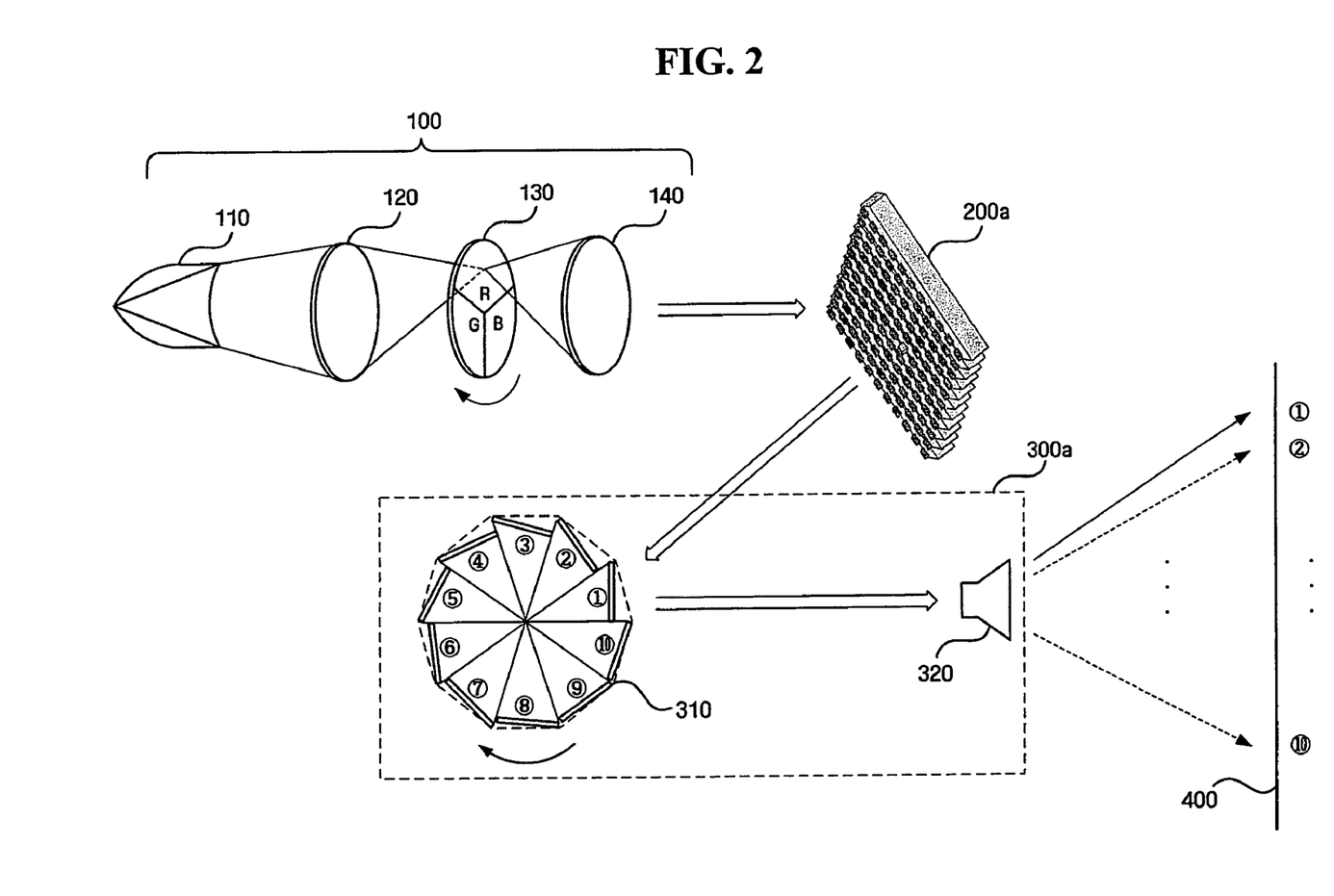
FIG. 2 is a view schematically illustrating an image display apparatus in accordance with an embodiment of the present invention.

FIG. 2 schematically illustrates an image display apparatus according to an embodiment of the present invention. Although this embodiment represents a single-plate-type image display apparatus using one reflection-type image display device 200a, the present invention is not limited thereto. Hence, an image display apparatus according to embodiments of the present invention may be a double or triple-plate-type image display apparatus using two or more reflection-type image display devices.

The image display apparatus illustrated in the drawing includes a light-emitting unit 100, the reflection-type image display device 200a, and a distributive projector unit 300a.

The light-emitting unit 100 irradiates light divided into R, G and B components onto the reflection-type image display device 200a. To this end, the light-emitting unit 100 includes a lamp 110, a condenser 120, a color wheel 130, and a diffuser 140.

Light emitted by the lamp 110 is condensed by means of the condenser 120 to be incident on the color wheel 130.

Three filters, that is, R, G and B color filters are equally distributed and disposed in the color wheel 130, and rotate at high speed. Thus, the color wheel 130 discretely transmits the incident light through the respective filters to repeatedly provide R, G or B light. At this time, the diffuser 140 spreads the light provided by the color wheel 130 to enlarge its transmission width, and irradiates parallel light, which is created by narrowing the spread light, to the reflection-type image display device 200a.

The reflection-type image display device 200a reflects the light irradiated from the light-emitting unit 100 to provide a given image. For example, a DMD may be used as the reflection-type image display device 200a. In this case, micromirrors provided in the DMD selectively reflect the light, which is irradiated from the light-emitting unit 100, toward the distributive projector unit 300a to produce an image.

Figure 3A:
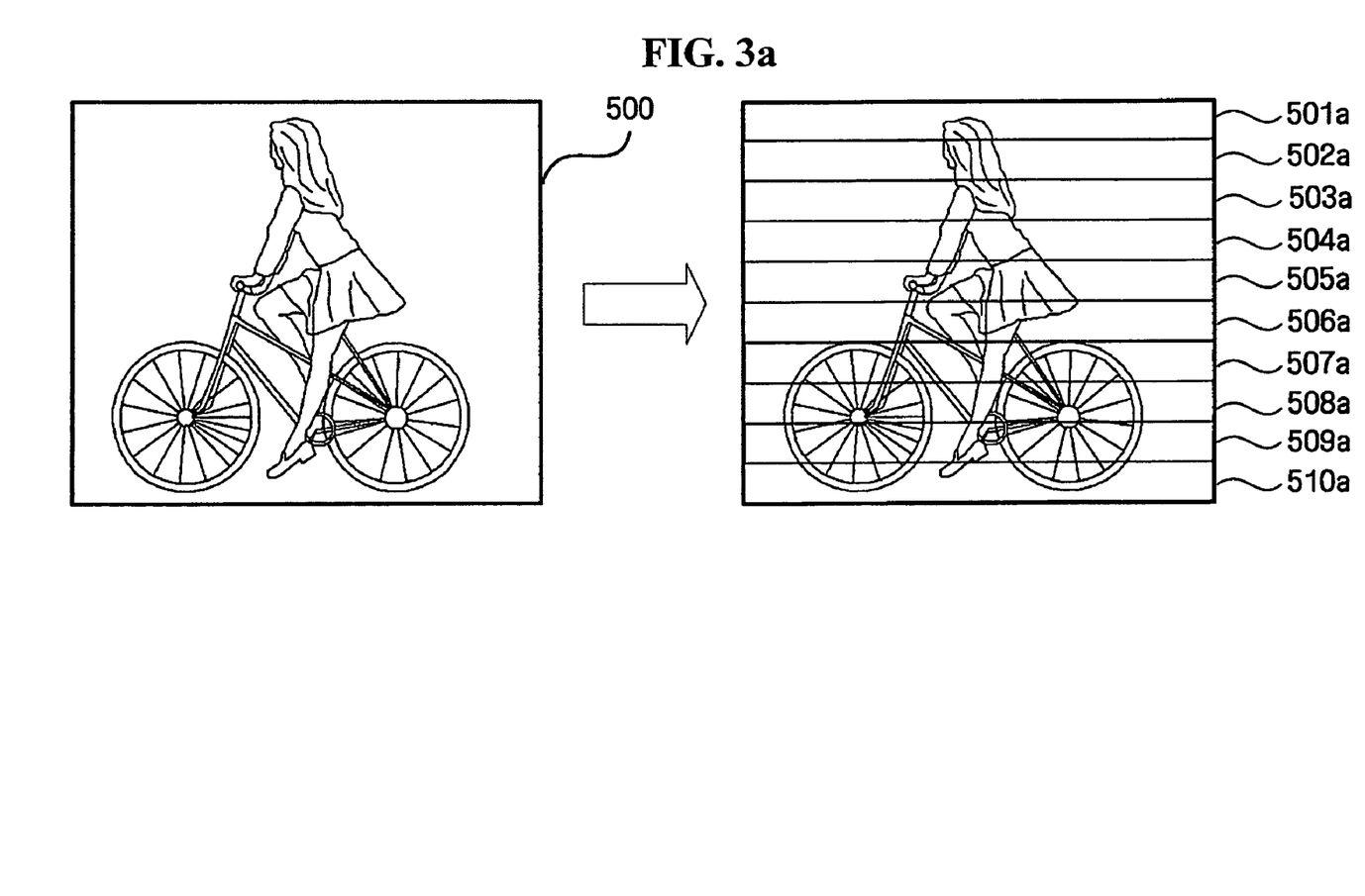
FIG. 3a is a view illustrating partial images provided by a reflection-type image display device in accordance with the embodiment of the present invention.

Here, the image provided by the reflection-type image display device 200a is a partial image constituting one image frame. As illustrated in FIG. 3A, for example, the reflection-type image display device 200a may discretely provide ten partial images 501a to 510a constituting an image 500. However, the present invention is not limited thereto, and the number of partial images that the reflection-type image display device 200a provides for each image frame may be varied.

Figure 3B:
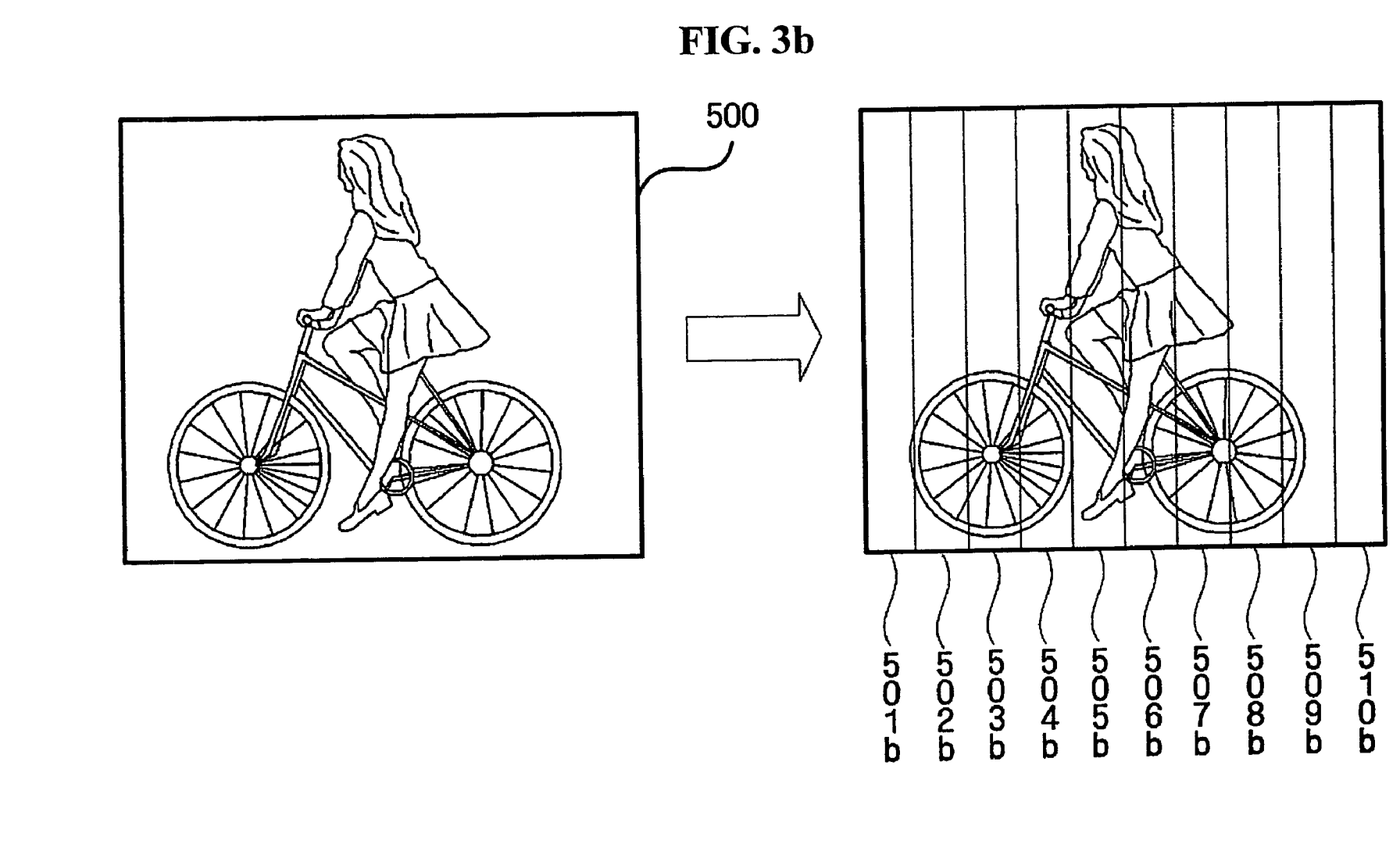
FIG. 3b is a view illustrating partial images provided by a reflection-type image display device in accordance with another embodiment of the present invention.

Although the embodiment of FIG. 3a illustrates that the reflection-type image display device 200a provides the partial images 501a to 510a, into which one image frame 500 is divided in a horizontal direction, the present invention is not limited thereto. As illustrated in FIG. 3b, for example, the reflection-type image display device 200a may also provide partial images 501b to 510b, into which the image frame 500 is divided in a vertical direction.

In the case of displaying a still image, the reflection-type image display device 200a discretely and repeatedly provides partial images of the same image frame. In contrast, in the case of displaying a moving image, the reflection-type image display device 200a discretely projects partial images of one image frame, and then discretely projects partial images of the next image frame.

Referring to FIG. 2, the distributive projector unit 300a displays a complete image frame by discretely projecting the partial images, which the reflection-type image display device 200a provides thereto, onto different positions. Specifically, the distributive projector unit 300a discretely projects the respective partial images onto coordinate areas on a screen 400, corresponding to coordinate areas in which the respective partial images are positioned on an original image frame. To this end, the distributive projector unit 300a includes a polygonal reflector reflecting the partial images, which the reflection-type image display device 200a provides thereto, at different angles, and a projection lens 320 magnifying an image reflected by the polygonal reflector and projecting the magnified image onto the screen 400. Although not illustrated, the distributive projector unit 300a may further include at least one optical device, such as a lens, a prism or a reflector, that adjusts the direction of the light.

Figure 4A:
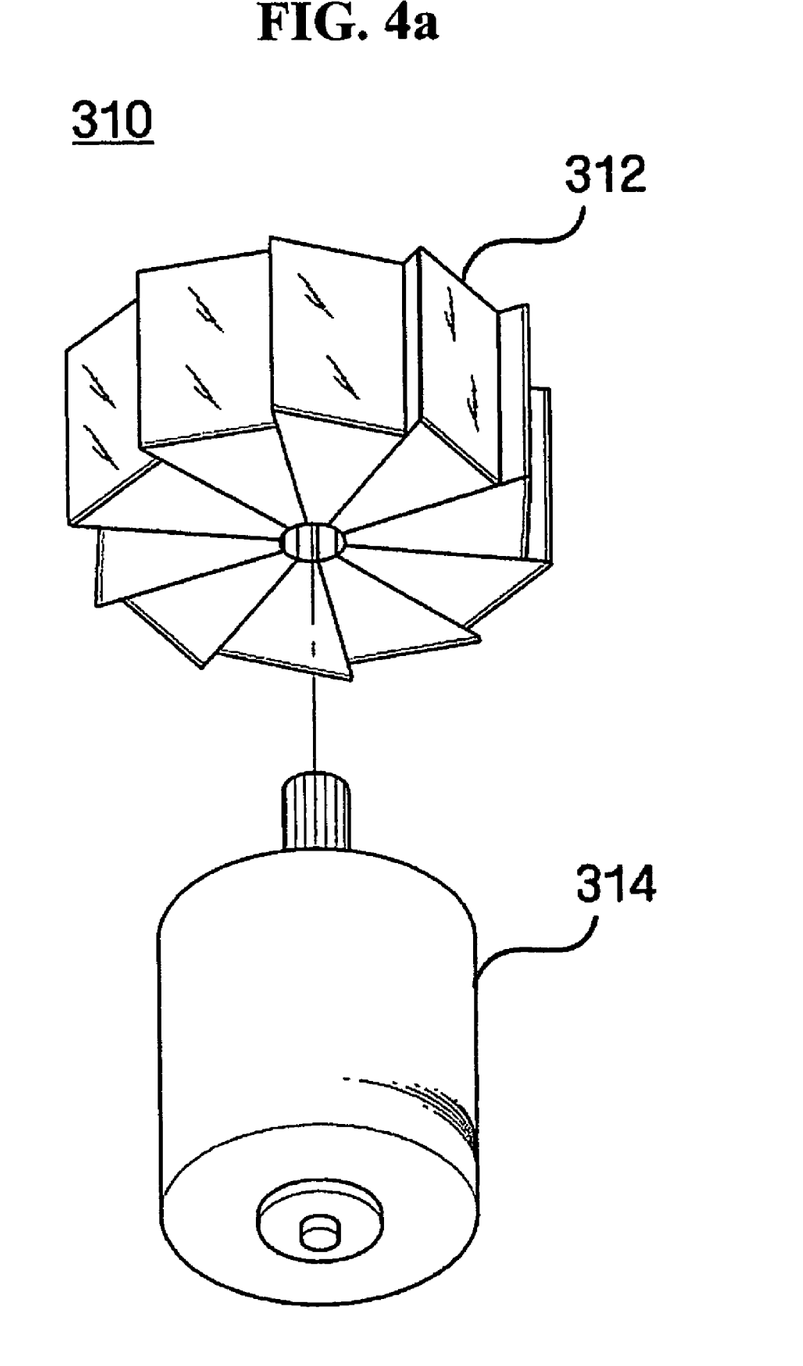
FIG. 4a is a perspective view of a rotary optical scanner in accordance with an embodiment of the present invention.
Figure 4B:
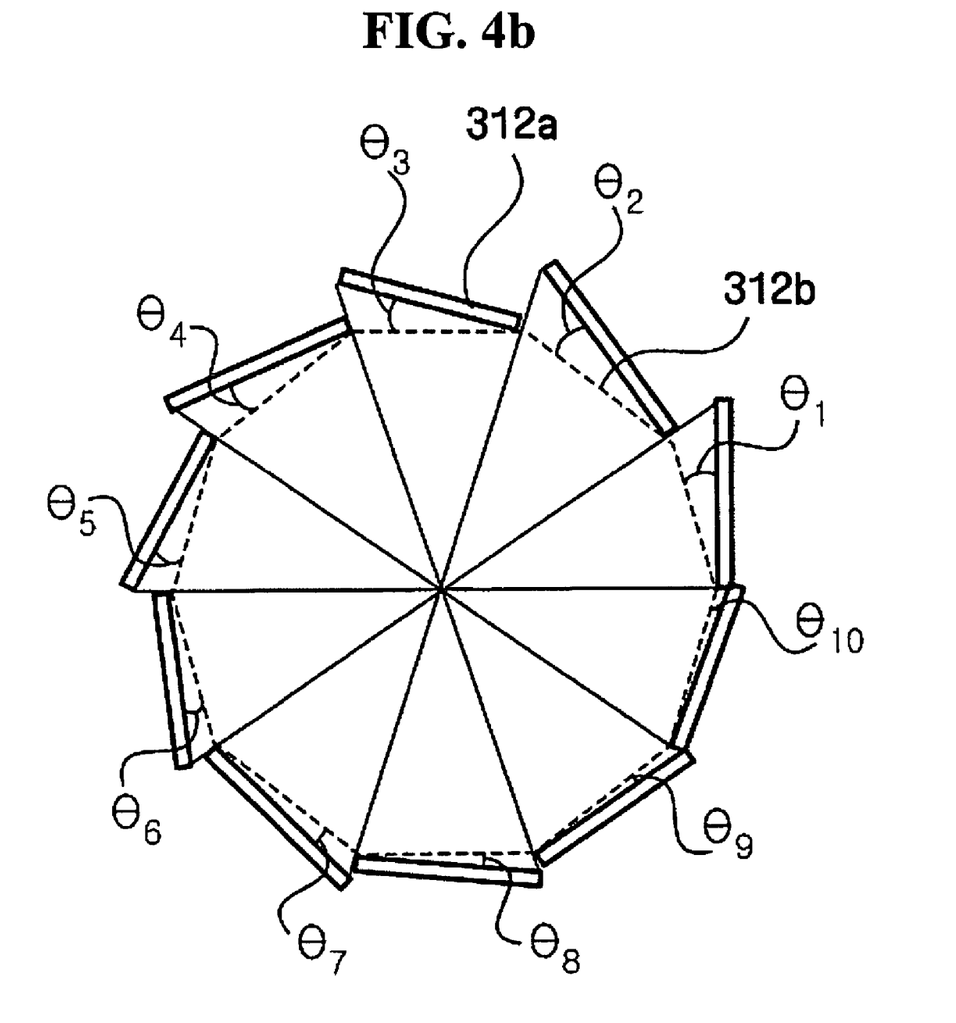
FIG. 4b is a plan view of a rotary optical scanner in accordance with an embodiment of the present invention.

In the present embodiment, the polygonal reflector is embodied as an optical scanner 310, and FIGS. 4a and 4b illustrate the optical scanner in more detail.

FIG. 4a illustrates a perspective view of the rotary optical scanner 310 according to an embodiment of the present invention, and FIG. 4b illustrates a plan view thereof.

The rotary optical scanner 310 illustrated in the drawings includes a polygon mirror 312 having a plurality of mirrors 312a connected to outer circumferential surfaces of a polygonal prism 312b at different angles with respect thereto, and a rotary motor 314 rotating the polygon mirror 312 by given angles about a center axis of the polygonal prism 312b. FIG. 4b illustrates incline angles that the respective mirrors 312a form with the outer circumferential surfaces of the polygonal prism 312b, and the incline angles conform to the relation: $\theta_1 > \theta_2 > \theta_3 > \ldots > \theta_9 > \theta_{10}$.

Although the rotary optical scanner 310 has ten mirrors 312a, the present invention is not limited thereto. However, the number of mirrors provided in the rotary optical scanner 310 may generally be equal to or greater than the number of partial images that the reflection-type image display device 200a provides for each image frame. For example, the number of mirrors provided in the rotary optical scanner 310 is the same as the number of partial images that the reflection-type image display device 200a provides for each image frame.

The rotation angle of the polygon mirror 312 rotating by the rotary motor 314 is inversely proportional to the number of partial images that the reflection-type image display device 200a provides for each image frame. For example, in the case of using a polygon mirror 312 that has ten mirrors, as illustrated in FIGS. 4a and 4b, if the reflection-type image display device 200a provides one image frame divided into ten partial images, as illustrated in FIGS. 3a and 3b, the rotary motor 314 may rotate each of the mirrors of the polygon mirror 312 in increments of 36 degrees. Thus, each of the ten mirrors provided in the polygon mirror 312 reflects one partial image per image frame. However, if the reflection-type image display device 200a provides one image frame divided into five partial images in the case of using the same polygon mirror 312, the rotary motor 314 may rotate each of the mirrors of the polygon mirror 312 in increments of 72 degrees. Each of odd-number or even-number mirrors among the ten mirrors provided in the polygon mirror 312 reflects one partial image per image frame.

Figure 5:
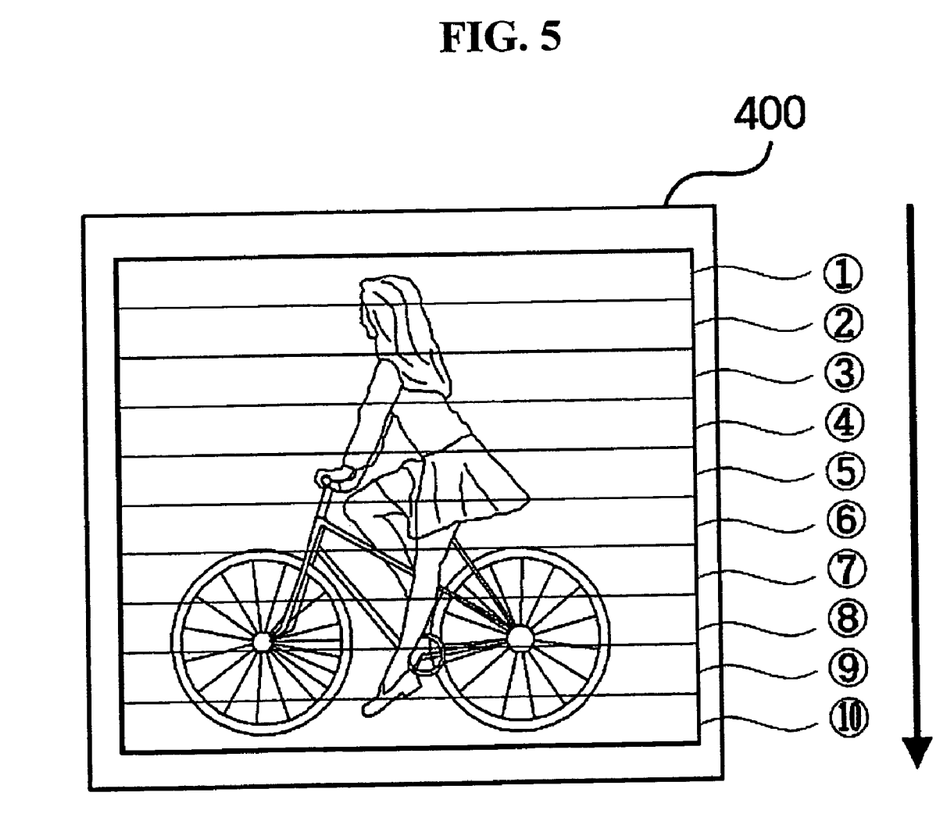
FIG. 5 is a view illustrating an image projected by a distributive projector unit in accordance with an embodiment of the present invention.

As for an image projected onto the screen by the above-mentioned image display apparatus, reference numerals 1 to 10 arranged on the screen 400 in FIG. 2 designate positions onto which the partial images reflected by the respective mirrors 1 to 10 of the optical scanner 310 are projected, respectively. If the reflection-type image display device 200a discretely provides an image frame that is horizontally divided into ten partial images, as in the embodiment illustrated in FIG. 3A, then an image projected by the distributive projector unit 300a is configured as illustrated in FIG. 5. In FIG. 5, an arrow designates an order to project the respective partial images, and reference numerals 1 to 10 represent that the mirrors 1 to 10 of the optical scanner 310 reflect the corresponding partial images, respectively.

As stated above, the image display apparatus does not project one image frame, but discretely projects partial images constituting one image frame. However, if the partial images are projected at high speed, a user perceives a complete image frame, due to an afterimage effect of the human visual system.

Figure 6:
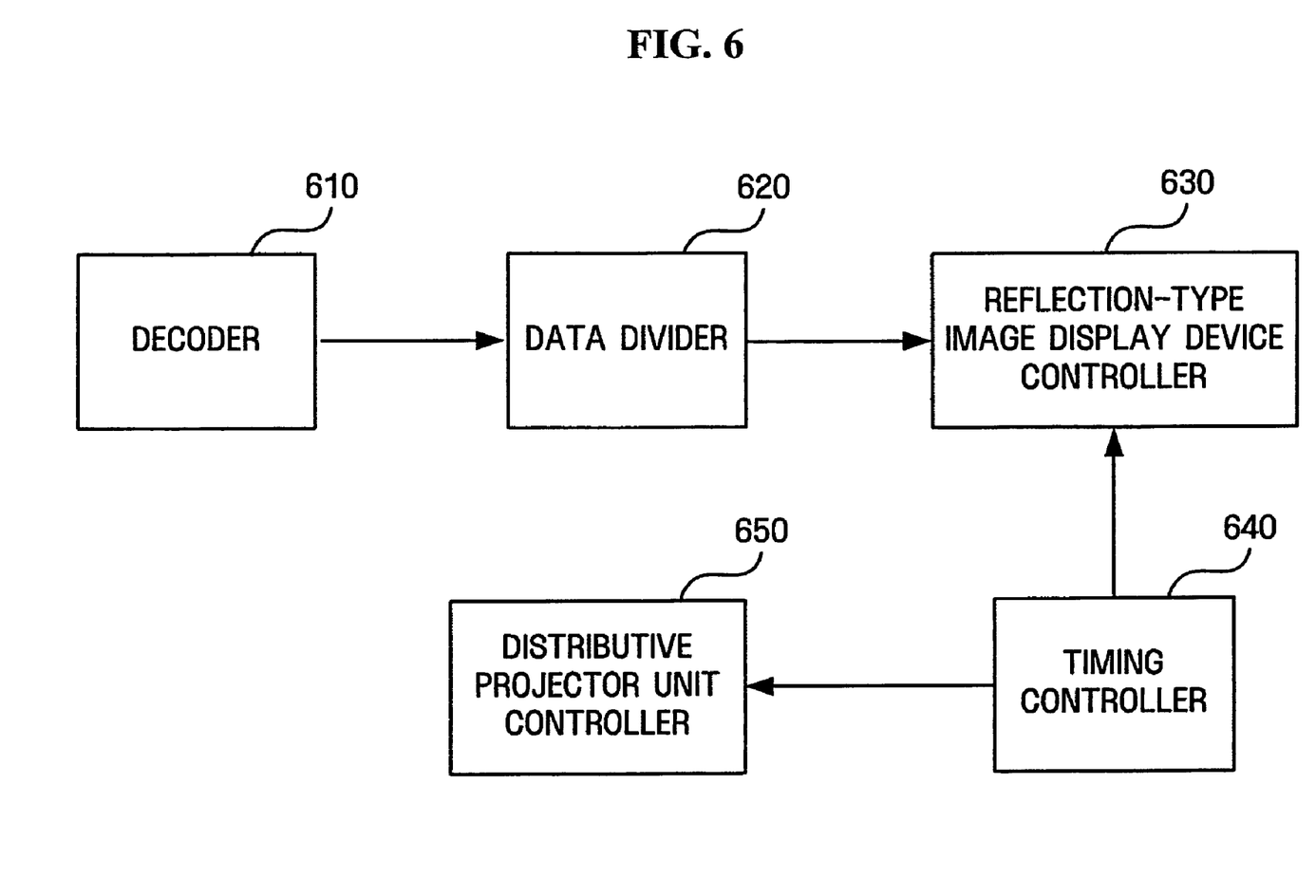
FIG. 6 is a block diagram illustrating a controller unit controlling an image display apparatus in accordance with an embodiment of the present invention.

FIG. 6 is a block diagram illustrating a controller unit that controls the image display device 200a and the projector unit 300a.

The controller unit illustrated in the drawing includes a decoder 610, a data divider 620, a reflection-type image display device controller 630, a timing controller 640, and a distributive projector unit controller 650.

The decoder 610 decodes video data. When the video data is still image data, the decoder 610 may be implemented according to still image compression/decompression schemes such as LZW, JPEG, and others. Also, when the video data is moving image data, the decoder 610 may be implemented according to moving image compression/decompression schemes such as MPEG-2 (Moving Picture Experts Group), MPEG-4, H.264, and others.

The data divider 620 divides data constituting one image frame, among the video data decoded by the decoder 610, into given sets of sub-data. The respective sets of sub-data are used to configure partial images of the image frame. The decoded image frame is generally stored as matrix-type digital data, and each coordinate point of the matrix contains pixel information of the image frame. Thus, the data divider 620 may divide a set of data present at coordinate points, which correspond to the respective partial images in the matrix-type data corresponding to one image frame, into sub-data.

The reflection-type image display device controller 630 stores therein sub-data provided from the data divider 620, and subsequently delivers the respective sub-data to the reflection-type image display device 200a according to the control by the timing controller 640. Depending on the embodiment, the reflection-type image display device controller 630 may convert the respective sub-data into a format capable of being processed by the reflection-type image display device 200a.

Thereupon, the reflection-type image display device 200a provides partial images by using the sub-data delivered from the reflection-type image display device controller 630. For example, when a DMD is used as the reflection-type image display device 200a, the DMD adjusts on/off states of respective micro-mirrors by using the sub-data, thereby providing partial images.

The distributive projector unit controller 650 delivers a control signal, which enables a distributive projector unit to project the partial images provided by the reflection-type image display device 200a onto appropriate positions, to the distributive projector unit 300a according to the control by the timing controller 640. For example, when the distributive projector unit 300a is constructed as illustrated in FIG. 2, the distributive projector unit controller 650 may output a signal to control the rotational operation of the rotary optical scanner 310 as described in FIGS. 4a and 4b.

Each element of FIG. 6 may be implemented as a module. Herein, the term "module" means software or a hardware component such as a FPGA (Field Programmable Gate Array) or an ASIC (Application Specific Integrated Circuit), which performs certain tasks, but is not limited thereto. A module may be configured to reside in an addressable storage medium, or may be configured to execute one or more processors. Thus, a module may include, by way of example, components such as software components, object-oriented software components, class components and task components, processes, functions, attributes, procedures, subroutines, segments of program code, drivers, firmware, microcode, circuitry, data, databases, data architectures, tables, arrays, and variables. The functionality provided by the components and modules may be incorporated into fewer components and modules or may be further separated into additional components and modules.

The image display apparatus can have a variety of structures, which will be described hereinafter.

Figure 7:
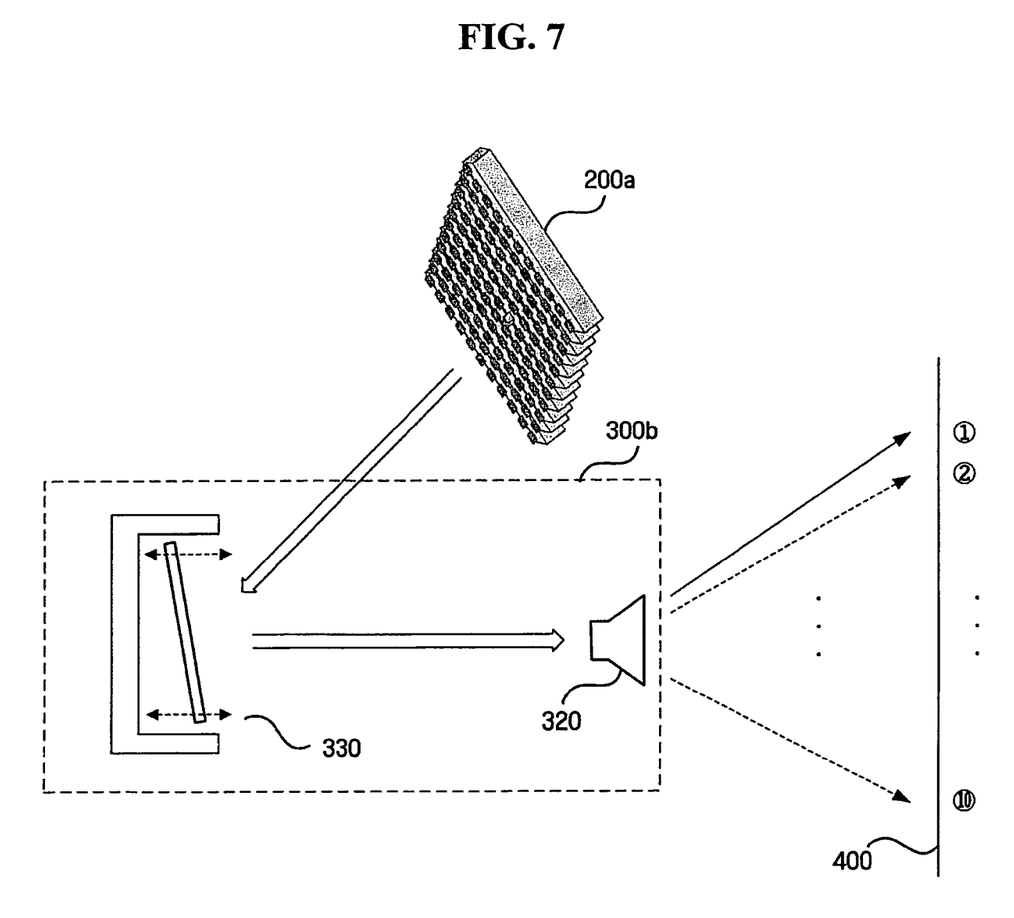
FIG. 7 is a view illustrating an image display apparatus in accordance with another embodiment of the present invention.

FIG. 7 illustrates an image display apparatus according to another embodiment of the present invention. In the embodiment of FIG. 7 and other embodiments, the light-emitting unit 100, which has been already described in detail with reference to FIG. 2, will not be described or illustrated.

The image display apparatus illustrated in the drawing includes the reflection-type image display device 200a and a distributive projector unit 300b. The distributive projector unit 300b basically performs a similar function to that of the distributive projector unit 300a described by way of FIG. 2. To this end, the distributive projector unit 300b includes a variable reflection angle mirror 330 and a projection lens 320.

The variable reflection angle mirror 330 is a type of polygon reflector, and reflects partial images provided by the reflection-type image display device 200a at different angles. An example of such a variable reflection angle mirror 330 is illustrated in FIG. 8.

Figure 8:
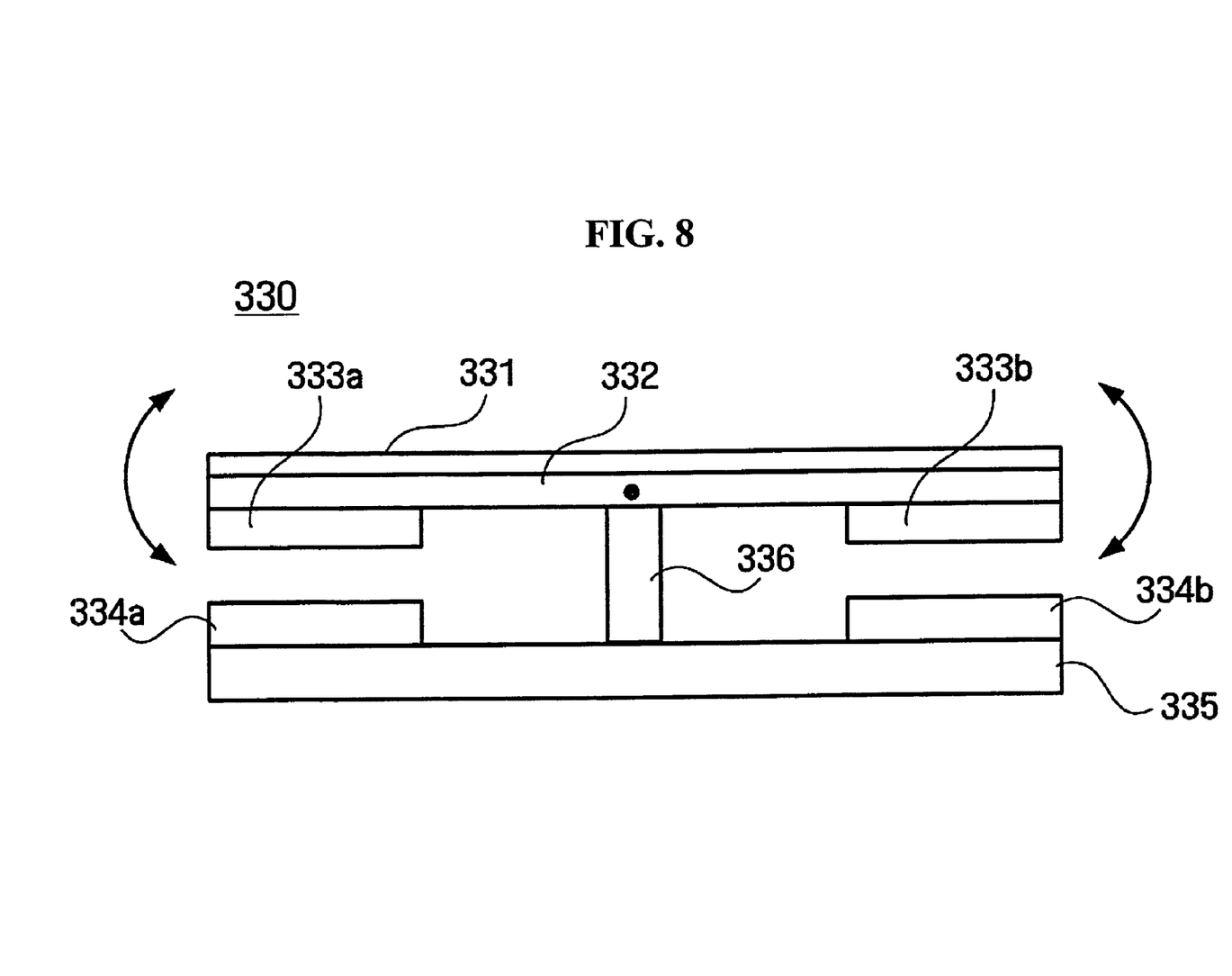
FIG. 8 is a view illustrating a variable reflection angle mirror in accordance with an embodiment of the present invention.

In the variable reflection angle mirror illustrated in FIG. 8, a support shaft 336 is located on a lower substrate 335, and lower electrodes 334a, 334b are formed on an upper surface of the lower substrate 335 on left and right sides of the support shaft 336, respectively. An upper substrate 332 is pivotally connected to the support shaft 336, and a mirror 331 is formed on the upper substrate 332. Here, the upper and lower substrates 332, 335 may be an insulative substrate such as a glass substrate, and the mirror 331 may be aluminum foil.

Upper electrodes 333a, 333b are formed on a lower surface of the upper substrate 332 on left and right sides of the support shaft 336, respectively. One or more upper and lower electrodes may possibly be formed in the upper and lower substrates 332, 335, respectively.

In such a structure of the variable reflection angle mirror 330, if voltage is applied to the upper electrodes 333a, 333b and the lower electrodes 334a, 334b, the mirror 331 is inclined to a right or left side with respect to the support shaft 336 at a given angle by the action of an electromagnetic force between the upper electrodes 333a, 333b and the lower electrodes 334a, 334b. Here, the incline angle of the mirror 331 can be determined by a voltage difference applied between the upper electrodes 333a, 333b and the lower electrodes 334a, 334b. Thus, by finely adjusting the voltage applied to the upper electrodes 333a, 333b and the lower electrodes 334a, 334b, the reflection angle of the mirror 331 can be changed. Accordingly, the variable angle reflection mirror may project images at a variety of angles, whereas the micro-mirrors 22, 24 of the related art discussed above can only project images at a single angle The structure of the variable reflection angle mirror 330, which has been described with reference to FIG. 8, is only an example, and the present invention is not limited thereto. For example, it is also possible to use another type of a variable reflection angle mirror adjusting a reflection angle thereof by means of an electrical or magnetic force.

Since the variable reflection angle mirror 330 performs a similar function to that of the rotary optical scanner 310 described in FIG. 2, the operation of the image display apparatus illustrated in FIG. 7 can be understood from the description taken with reference to FIGS. 2 to 6.

In the image display apparatuses described in FIGS. 2 to 8, the projector units 300a, 300b each project partial images in a 1-dimensional direction (a single direction such as a horizontal or a vertical direction). Employment of such image display apparatuses enables a small-scale reflection-type image display apparatus to display an image on a level with larger-scale reflection-type image display apparatus. For example, when an image display apparatus discretely projects an image frame divided into ten partial images in a 1-dimensional direction, as illustrated in FIG. 5, a DMD with 100× 1000 micro-mirrors can have the same effect as that of a DMD with 1000×1000 micro-mirrors.

However, according to another embodiment of the present invention, it is also possible to implement an image display apparatus discretely projecting partial images, into which one image frame is divided in the form of a matrix, in a 2-dimensional direction (e.g., a combination of horizontal and vertical directions), which will be described hereinafter.

Figure 9:
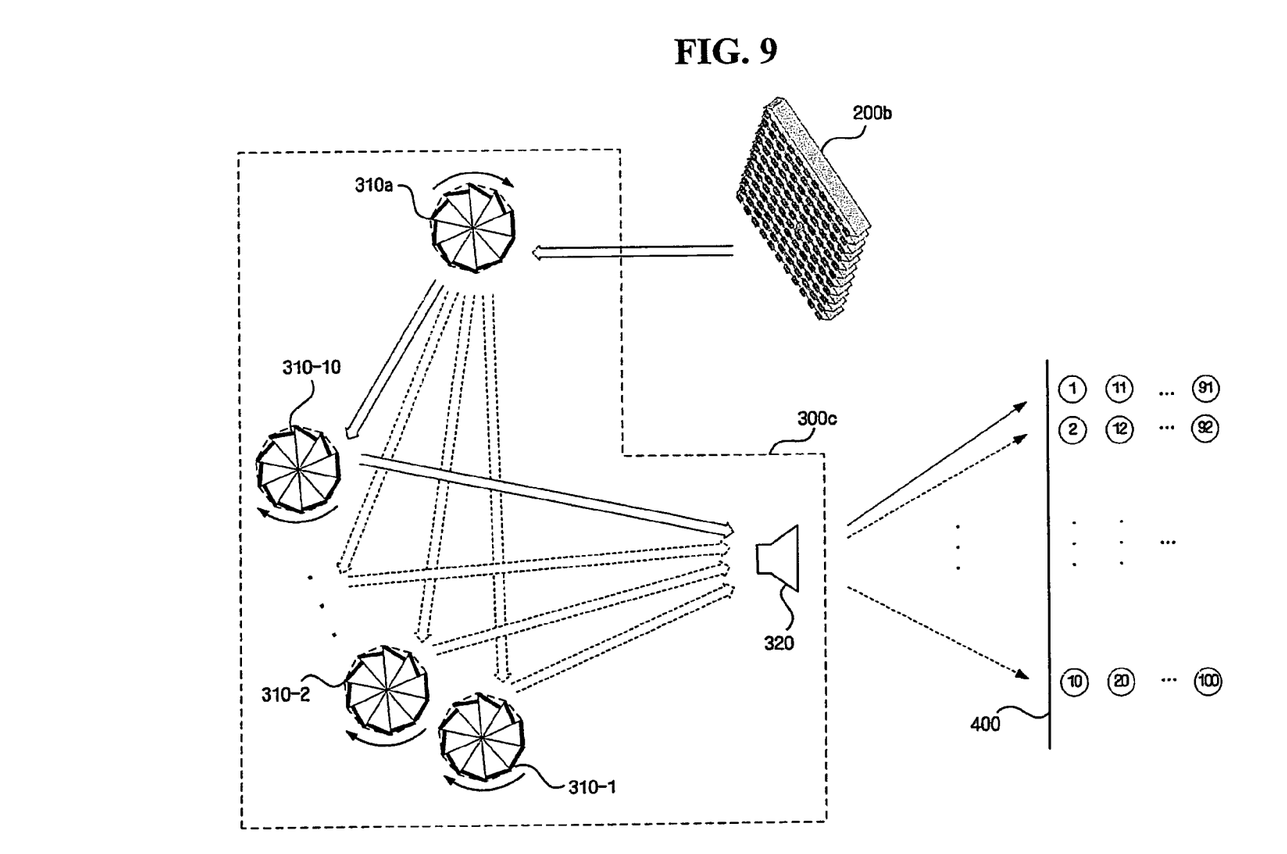
FIG. 9 is a view illustrating an image display apparatus in accordance with still another embodiment of the present invention.

FIG. 9 illustrates an image display apparatus according to still another embodiment of the present invention.

The image display apparatus illustrated in the drawing includes a reflection-type image display device 200b and a distributive projector unit 300c.

Figure 10:
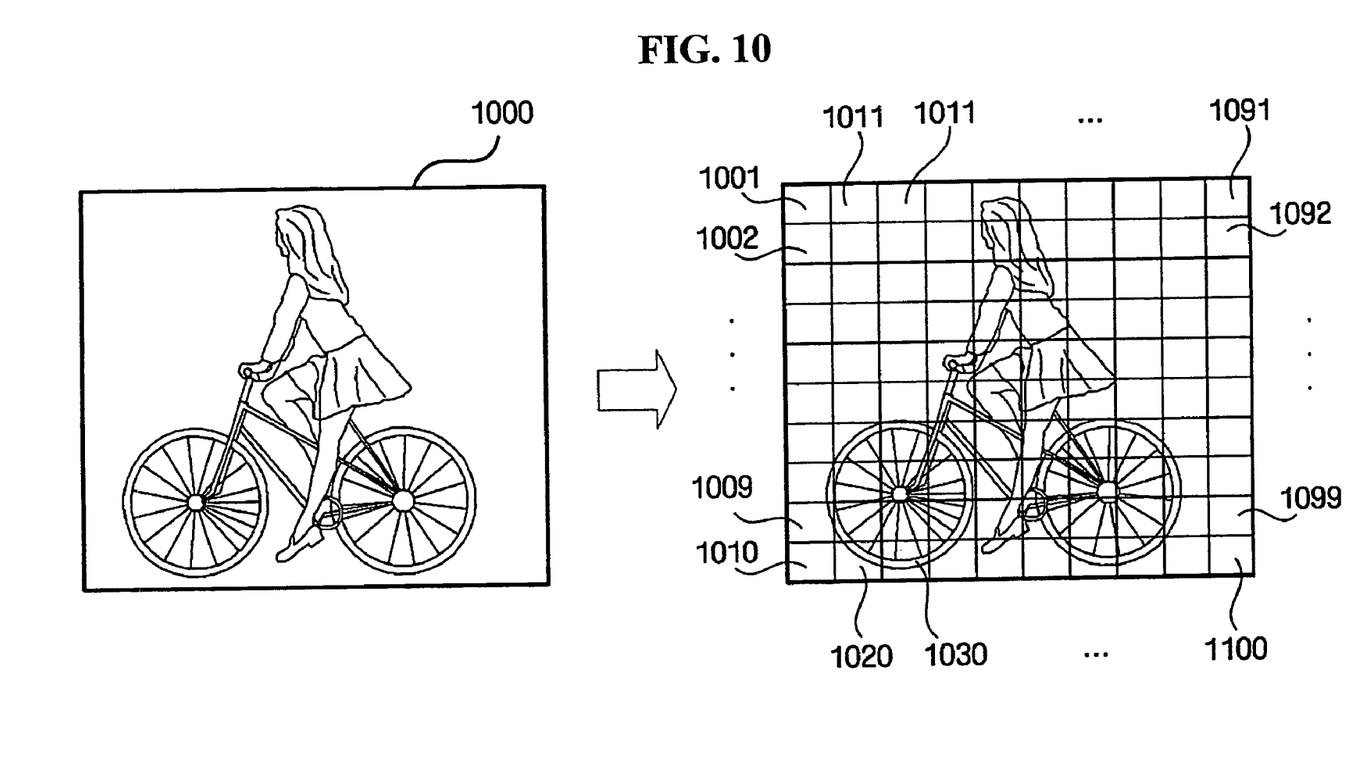
FIG. 10 is a view for explaining partial images provided by a reflection-type image display device in accordance with another embodiment of the present invention.

The reflection-type image display device 200b provides a plurality of partial images into which one image frame is divided in the form of a matrix. As illustrated in FIG. 10, for example, the reflection-type image display device 200b can discretely provide 100 partial images 1001 to 1100 constituting an image frame 1000. However, the present invention is not limited thereto, and the number of partial images that the reflection-type image display device 200b provides for each image frame may differ.

Referring to FIG. 9, the distributive projector unit 300c displays a complete image frame by projecting the partial images that the reflection-type image display device 200b provides thereto onto different positions. Specifically, the distributive projector unit 300c projects the respective partial images onto coordinate areas on the screen 400 corresponding to coordinate areas in which the respective partial images are positioned in an original image frame. To this end, the distributive projector unit 300c includes a plurality of polygonal reflectors 310a, 310-1 to 310-10 reflecting the partial images, which the reflection-type image display device 200b provides thereto, at different angles, and a projection lens 320. Although all the polygonal reflectors are embodied as a rotary optical scanner, the present invention is not limited thereto. Thus, a variable reflection angle mirror may be substituted for at least one polygonal reflector among the plurality of polygonal reflectors.

The plurality of polygonal reflectors 310a, 310-1 to 310-10 includes a master polygonal reflector 310a reflecting the partial images, which the reflection-type image display device 200b provides thereto, over a given angle range in a first direction, and slave polygonal reflectors 310-1 to 310-10 reflecting the partial images, which the master polygonal reflector 310a reflects, over a given angle range in a second direction. As illustrated, the second direction is perpendicular to the first direction. Also, the first direction may be either a horizontal direction or a vertical direction, and the second direction is perpendicular to the first direction.

The number of the slave polygonal reflectors 310-1 to 310-10 may vary depending on the number of rows or columns composed of partial images, the number of pixels to be projected, and others. In this embodiment, for example, ten rotary optical scanners 310-1 to 310-10 capable of reflecting partial images at 10 angles (among them, rotary optical scanners corresponding to 310-3 to 310-9 are not illustrated) are provided in order to project 100 partial images constituting one image frame, as illustrated in FIG. 10.

Here, each of the slave polygonal reflectors 310-1 to 310-10 controls reflecting a specific row or column composed of partial images into which one image frame is divided in the form of a matrix, and the master polygonal reflector 310a reflects each partial image to one of the slave polygonal reflectors 310-1 to 310-10 according to a row or column to which the corresponding partial image belongs.

For example, when the reflection-type image display device 200b provides partial images 1001 to 1100 as illustrated in FIG. 10, a first slave polygonal reflector 310-1 of the slave polygonal reflectors 310-1 to 310-10 may take charge of reflecting the partial images 1001 to 1010 constituting a first column, and a second slave polygonal reflector 310-2 may take charge of reflecting the partial images 1011 to 1020 constituting a second column. In this way, the remaining slave polygonal reflectors 310-3 to 310-10 may take charge of reflecting the partial images constituting third to tenth columns, respectively.

Otherwise, the first slave polygonal reflector 310-1 of the slave polygonal reflectors 310-1 to 310-10 may take charge of reflecting the partial images 1001, 1011, . . . , 1091 constituting a first row, and the second slave polygonal reflector 310-2 may take charge of reflecting the partial images 1002, 1012, . . . , 1092 constituting a second row. In this way, the remaining slave polygonal reflectors 310-3 to 310-10 may take charge of reflecting the partial images constituting third to tenth rows, respectively.

Reference numerals 1 to 100 arranged on the screen 400 designate positions onto which the respective partial images are projected.

According to another embodiment of the present invention, a DMD (not illustrated) may function as the slave polygonal reflectors 310-1 to 310-10. In this case, micro-mirrors provided in the DMD may perform a similar function to that of the variable reflection angle mirror 330 described with reference to FIG. 8. In addition to this, various image display apparatuses may be implemented through various combinations of one or more types of polygonal reflectors or reflection-type image display devices, and these image display apparatuses should be regarded as embodiments of the present invention.

Figure 11:
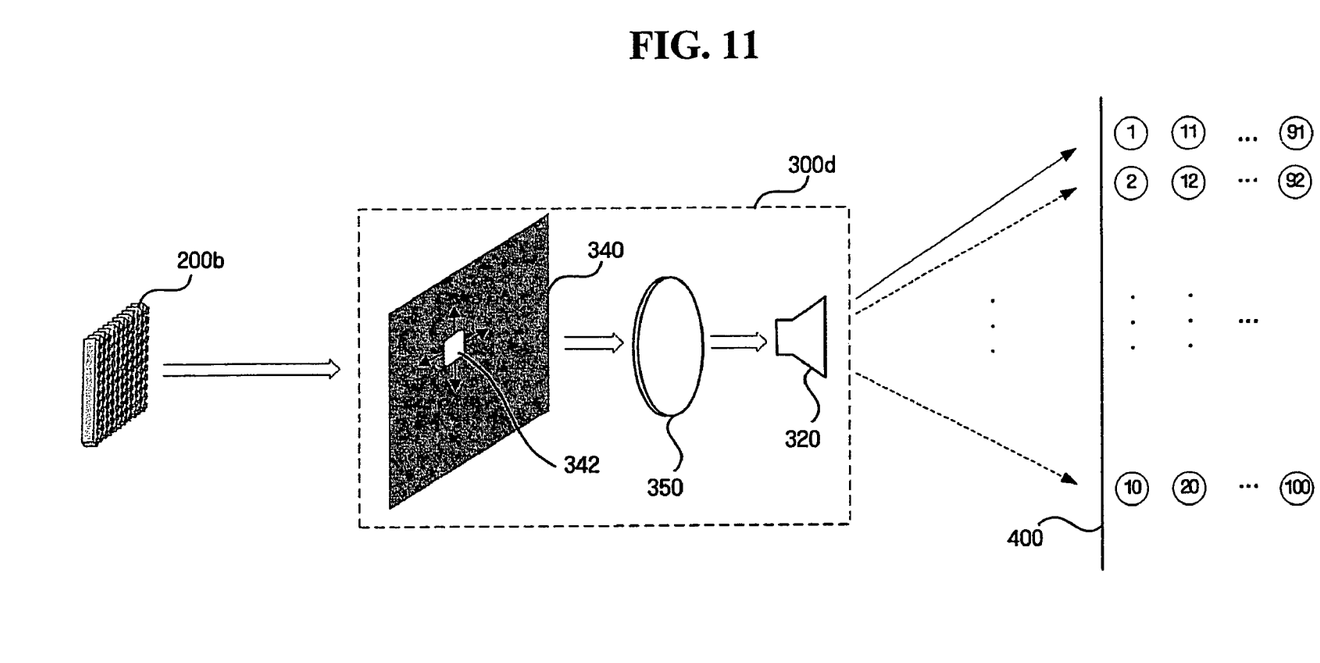
FIG. 11 is a view illustrating an image display apparatus in accordance with yet another embodiment of the present invention.

FIG. 11 illustrates an image display apparatus according to yet another embodiment of the present invention.

The image display apparatus illustrated in the drawing includes the reflection-type image display device 200b and a distributive projector unit 300d.

The distributive projector unit 300d displays a complete image frame by projecting the partial images that the reflection-type image display device 200b provides thereto onto different positions. To this end, the distributive projector unit 300d includes an image transmission filter 340, a condensing lens 350, and a projection lens 320.

The image transmission filter 340 allows light transmission in coordinate areas 342 (hereinafter referred to as "light transmission areas") corresponding to projection positions of the partial images provided by the reflection-type image display device 200b. Thus, the image transmission filter 340 controls positions, onto which the respective partial images are to be projected, by dynamically setting the light transmission areas 342 according to the partial image provided by the reflection-type image display device 200b. This image transmission filter 340 may be implemented by means of various filter devices capable of providing a binary switching function for light transmission, such as an FLCD.

The condensing lens 350 condenses light passing through the image transmission filter 340 to provide the condensed light to the projection lens 320, and the projection lens 320 magnifies the light provided thereto to project the magnified light onto the screen 400.

Reference numerals 1 to 100 arranged on the screen 400 designate positions onto which the respective partial images are projected.

Although the projection lens 320 is disposed at a distal end of the respective distributive projector unit 300a to 300d to magnify partial images and project the magnified partial images on the screen 400 in the above embodiments, the projection lens 320 may be disposed at a leading end of the respective distributive projector unit 300a to 300d to previously magnify partial images provided by the reflection-type image display device 200a, 200b.

According to the embodiments of the present invention as described above, there is an advantage in that the quality of a projected image can be maintained even when a reflection-type image display device is simplified.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image display apparatus comprising: a light-emitting unit; a reflection-type image display device which provides partial images, the partial images constituting an image frame, by reflecting light irradiated from the light-emitting unit; a screen; and a distributive projector unit which displays the image frame by discretely projecting the partial images provided from the reflection-type image display device onto different positions of the screen,
   wherein the distributive projector unit includes a plurality of polygonal reflectors reflecting the partial images,
   wherein, the plurality of polygonal reflectors include a master polygonal reflector to receive the partial images from the reflection-type image display device at different angles and reflect the partial images over an angle range in a first direction, and a plurality of slave polygonal reflectors to receive the reflected partial images from the master polygonal reflector and reflect the partial images over an angle range in a second direction.

2. The image display apparatus of claim 1, wherein the polygonal reflector is a rotary optical scanner comprising a polygonal prism and a plurality of mirrors connected to outer circumferential surfaces of the polygonal prism at different angles with respect to the polygonal prism, and the rotary optical scanner rotates by given angles about a center axis of the polygonal prism.

3. The image display apparatus of claim 1, wherein the first and second directions are perpendicular to each other.

4. The image display apparatus of claim 1, wherein the distributive projector unit includes an image transmission filter transmitting the partial images in coordinate areas corresponding to projection positions of the partial images provided by the reflection-type image display device.

5. The image display apparatus of claim 1, wherein the distributive projector unit includes a projection lens magnifying the partial images to be projected onto the different positions.

6. The image display apparatus of claim 1, wherein the distributive projector unit projects the partial images in a 1-dimensional or 2-dimensional arrangement.

7. An apparatus to display an image, comprising: an image display device to reflect the image and divide the image into a plurality of partial images; and a projector to receive the partial images and project a plurality of the received partial images at different positions to thereby display the image
   wherein the projector includes a plurality of polygonal reflectors reflecting the partial images, at different angles,
   wherein the plurality of polygonal reflectors include a master polygonal reflector to receive the partial images from the image display device and reflect the partial images over an angle range in a first direction, and a plurality of slave polygonal reflectors to receive the reflected partial images from the master polygonal reflector and reflect the partial images over an angle range in a second direction.

8. The apparatus of claim 7, wherein the projector is a variable reflection angle mirror.

9. The apparatus of claim 7, wherein the projector is a polygonal prism.

10. The apparatus of claim 8, wherein the mirror reflects a plurality of the partial images.

* * * * *